United States Patent
Yao

(10) Patent No.: US 8,455,575 B2
(45) Date of Patent: Jun. 4, 2013

(54) WOOD POWDER-CONTAINING MATERIAL, METHOD OF MANUFACTURING THE SAME, AND COMPACT

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/358,604

(22) Filed: Jan. 26, 2012

(65) Prior Publication Data

US 2013/0072599 A1   Mar. 21, 2013

(30) Foreign Application Priority Data

Sep. 20, 2011 (JP) ................................. 2011-205353

(51) Int. Cl.
*C08L 97/02* (2006.01)

(52) U.S. Cl.
USPC ................................ 524/13; 524/14; 524/127

(58) Field of Classification Search
USPC .............................................. 524/13, 14, 127
See application file for complete search history.

(56) References Cited

FOREIGN PATENT DOCUMENTS

JP   A-2006-272696   10/2006
JP   B2-4371373      11/2009

*Primary Examiner* — Peter Szekely
(74) *Attorney, Agent, or Firm* — Oliff & Berridge, PLC

(57) ABSTRACT

A wood powder-containing material includes wood powder having a volume average particle diameter of from about 1 μm to about 5 mm, an aliphatic polyester, and a condensed phosphate ester.

21 Claims, 1 Drawing Sheet

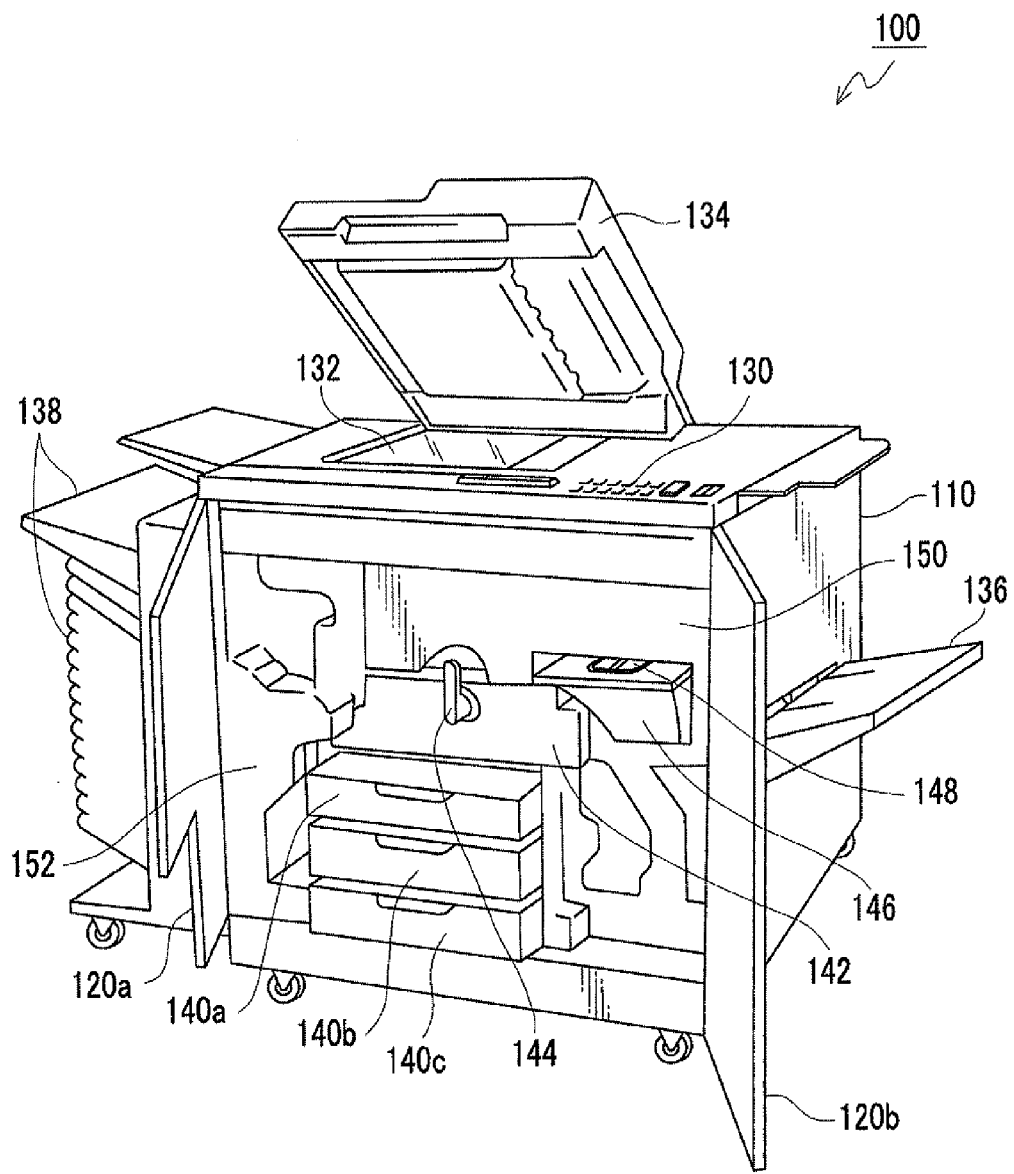

WOOD POWDER-CONTAINING MATERIAL, METHOD OF MANUFACTURING THE SAME, AND COMPACT

CROSS-REFERENCE TO RELATED APPLICATIONS

This application is based on and claims priority under 35 USC 119 from Japanese Patent Application No. 2011-205353 filed Sep. 20, 2011.

BACKGROUND

1. Technical Field

The present invention relates to a wood powder-containing material, a method of manufacturing the same, and a compact.

2. Related Art

In the related art, a woody composite resin compact has been manufactured by mixing a woody material and a thermoplastic resin so as to mold a pellet-shaped mixture, and extrusion-molding the pellet-shaped mixture from the viewpoint of reduction of environmental load.

SUMMARY

According to a first aspect of the invention, there is provided a wood powder-containing material including wood powder having a volume-average particle diameter of from about 1 μm to about 5 mm, an aliphatic polyester, and a condensed phosphate ester.

BRIEF DESCRIPTION OF THE DRAWINGS

Exemplary embodiments of the present invention will be described in detail based on the following FIGURES, wherein:

FIG. 1 is a schematic view showing an example of parts of electronic and electrical devices having the compact according to the exemplary embodiment.

DETAILED DESCRIPTION

Hereinafter, exemplary embodiments, which are examples of the wood powder-containing material, the method of manufacturing the same, and the compact according to the exemplary embodiment of the invention, will be described.

[Wood Powder-Containing Material]

The wood powder-containing material according to the exemplary embodiment is composed of wood powder having a volume-average particle diameter of from 1 μm to 5 mm (or from about 1 μm to about 5 mm), an aliphatic polyester, and a condensed phosphate ester.

The wood powder-containing material according to the exemplary embodiment may be molded using a molding machine using the above composition.

The reason of the above fact is not clear, but is considered to be the following.

In the related art, in a material that is a mixture of wood powder and a resin, since the fluidity is degraded compared with a material having a resin-only composition due to the wood powder, and the wood powder is baked or deteriorated due to the molding temperature, there is a phenomenon that the heat resistance is degraded, and it is difficult to mold the material using a molding machine. This phenomenon becomes more significant as the fraction of the wood powder increases.

However, in the wood powder-containing material according to the exemplary embodiment of the invention, it is considered that, since the wood powder having a volume average particle diameter in the above range is an exposed area in which the condensed phosphate ester can be easily and selectively coordinated, the condensed phosphate ester is selectively present (hereinafter sometimes expressed by "coordinated") on the surface of the wood powder, and the wood powder is supplied with the properties of the condensed phosphate ester to easily slide. Furthermore, it is considered that, since the aliphatic polyester can easily mix with the wood powder, the wood powder becomes easily dispersed in the aliphatic polyester.

In addition, it is considered that the wood powder having a volume average particle diameter in the above range is also an exposed area which is not easily baked or deteriorated.

Therefore, in the wood powder-containing material according to the exemplary embodiment, it is considered that, even when the content of the wood powder is increased to a range that has not been allowed in the related art, degradation of the fluidity due to the wood powder is suppressed, and heat resistance with which the wood powder becomes resistant to the baking or degradation of the wood powder, which is caused by the molding temperature, is supplied, and therefore the wood powder-containing material may be molded using a molding machine.

As a result, the wood powder-containing material according to the exemplary embodiment may be molded into various shapes using a molding machine, and a compact may be obtained at low costs.

In addition, it is found that the wood powder-containing material according to the exemplary embodiment may produce a compact that is excellent in terms of the flexibility and dimensional stability while the reasons are not clear.

Hereinafter, the respective components of the wood powder-containing material according to the exemplary embodiment will be described.

(Wood Powder)

The wood powder is not particularly limited as long as the wood powder is a ground product of wood (wood piece), and may be selected from ground products of wood, such as hinoki cypress, cryptomeria, pine, fagaceae, oak, chestnut, cerasus, and abies, depending on the appearance or texture of the compact.

Particularly, a preferred example of the wood powder is blasted wood powder obtained by pressurizing and then depressurizing wood (wood piece). Since the blasted wood powder has an increased specific surface area compared with wood powder obtained by ordinary grinding, the mixing with the aliphatic polyester becomes favorable, and the fluidity of the wood powder-containing material is easily improved.

The wood powder may be used singly or two or more kinds may be jointly used.

The volume average particle diameter of the wood powder is from 1 μm to 5 mm (or from about 1 μm to about 5 mm), desirably from 2 μm to 3 mm, and more desirably from 3 μm to 2 mm.

When the volume average particle diameter of the wood powder is set to 1 μm or more, the condensed phosphate ester may be coordinated on the surface of the wood powder, and degradation of the fluidity is suppressed.

On the other hand, when the volume average particle diameter of the wood powder is set to 5 mm or less, occurrence of baking or deterioration of the wood powder at the molding temperature is suppressed by an increase in the exposed area of the wood powder, and, consequently, deterioration of the mechanical properties or worsening of the appearance of an obtained compact is suppressed.

Here, the volume average particle diameter of the wood powder is a value that is measured in the following manner using a measurement specimen made by taking a 20×20 mm-sized specimen from the obtained compact.

After the aliphatic polyester is dissolved in a solvent (for example, chloroform) (in a case in which a resin other than the aliphatic polyester is included, the aliphatic polyester and the resin other than the aliphatic polyester are dissolved in a solvent), the wood powder is taken through filtration, and the volume average particle diameter is measured using a particle size distribution measuring apparatus (manufactured by Shimadzu Corporation, SALD-2200).

The content of the wood powder is, for example, preferably 30% by mass or more with respect to the total amount of the wood powder-containing material, but desirably 50% by mass or more, and more desirably 70% by mass or more.

Even when the content of the wood powder is in the above range, the wood powder-containing material may be molded using a molding machine.

meanwhile, the upper limit of the content of the wood powder is preferably 98% by mass or less from the viewpoint of the fluidity during molding and the flexibility of a compact, and desirably 90% by mass or less.

The content of the wood powder is, for example, particularly preferably from 30% by mass to 90% by mass (or from about 30% by mass to about 90% by mass) with respect to the total amount of the wood powder-containing material.

(Aliphatic Polyester)

The aliphatic polyester is not particularly limited, and examples thereof include a hydroxycarboxylic acid polymer, a polycondensate of an aliphatic diol and an aliphatic carboxylic acid, and the like.

Specific examples of the aliphatic polyester include a polylactic acid, poly-3-hydroxybutyrate, polyhydroxy hexanate, polyhydroxyvalerate, copolymers thereof, polybutylene succinate, polybutylene adipate, polyethylene succinate, polyethylene adipate, copolymers of two or more of the above, and the like.

The aliphatic polyester may be used singly, or two or more may be jointly used.

The aliphatic polyester may be, for example, a single continuum (for example, polyhydroxy butyrate), may have an optical isomer, such as the L body and D body of a polylactic acid, mixed therein, or may have an optical isomer copolymerized therein.

Among them, the aliphatic polyester is preferably a polylactic acid, polyhydroxy butyrate, polybutylene succinate, and copolymers of two or more of the above from the viewpoint of satisfying both the fluidity and heat resistance (baking and deterioration of the wood powder) and more suitable moldability by a molding machine in the combination of the wood powder and the condensed phosphate ester.

The weight-average molecular weight of the aliphatic polyester is not particularly limited, but is preferably from 8000 to 150000, and desirably from 20000 to 100000.

Meanwhile, the weight-average molecular weight is a value measured using a gel permeation chromatography apparatus (manufactured by Shimidzu Corporation, Prominence GPC type) and Shim-pack GPC-80M for a measuring column. This applies in the below.

The content of the aliphatic polyester is preferably from 5% by mass to 65% by mass (or from about 5% by mass to about 65% by mass), desirably from 10% by mass to 60% by mass, and more desirably from 40% by mass to 60% by mass, with respect to the total amount of the wood powder-containing material.

When the content of the aliphatic polyester is set to 5% by mass or more, degradation of the fluidity of the wood powder-containing material is easily suppressed.

On the other hand, when the content of the aliphatic polyester is set to 65% by mass or less, degradation of the heat resistance of the wood powder-containing material is easily suppressed.

In the wood powder-containing material, the content ratio of the wood powder to the aliphatic polyester is, for example, 1:1 to 16:1.

Here, the wood powder-containing material may also include a resin other than the aliphatic polyester, and the resin is mixed in a range in which the moldability by a molding machine is not degraded.

Examples of the resin include well-known thermoplastic resins in the related art, and specific examples thereof include a polycarbonate resin, a polypropylene resin, a polyimide resin, an aromatic polyester resin, a polyolefin resin, a polyester carbonate resin, a polyphenylene ether resin, a polyphenylene sulfide resin, a polysulfone resin, a polyethersulfone resin, a polyarylene resin, a polyetherimide resin, a polyacetal resin, polyvinyl acetal resin, a polyketone resin, a polyether ketone resin, a polyether ether ketone resin, a polyaryl ketone resin, a polyether nitrile resin, a liquid crystal resin, a polybenzimidazole resin, a polyparabanic acid resin, a vinyl-based polymer or copolymer resin obtained by polymerizing or copolymerizing one or more vinyl monomers selected from a group consisting of an aromatic alkenyl compound, an ester of methacrylic aid, an ester of acrylic acid, and a vinyl cyanide compound, a diene-aromatic alkenyl compound copolymer resin, a vinyl cyanide-diene-aromatic alkyenyl compound copolymer resin, an aromatic alkenyl compound-diene-vinyl cyanide-N-phenyl maleimide copolymer resin, a vinyl cyanide-(ethylene-dien-propylene (EPDM))-aromatic alkenyl compound copolymer resin, polyolefin, a vinyl chloride resin, a chlorinated vinyl chloride resin, and the like.

The resin may be used singly, or two or more may be jointly used.

(Condensed Phosphate Ester)

Examples of the condensed phosphate ester include bisphenol A-type, biphenylene-type, isophthal-type, and other aromatic condensed phosphate esters, and specific examples include condensed phosphate esters represented by the following formula (I) or (II)

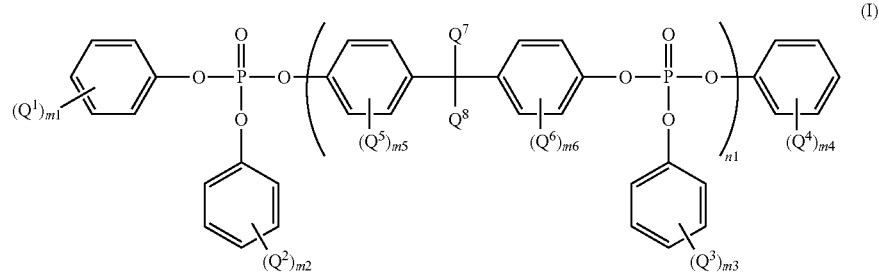

In the formula (I), each of $Q^1$, $Q^2$, $Q^3$, and $Q^4$ independently represents a hydrogen atom or an alkyl group having a carbon number of from 1 to 6, each of $Q^5$, $Q^6$, $Q^7$, and $Q^8$ independently represents a hydrogen atom or a methyl group, each of m1, m2, m3, and m4 independently represents an integer of from 0 to 3, each of m5 and m6 independently represents an integer of from 0 to 2, and n1 represents an integer of from 0 to 10.

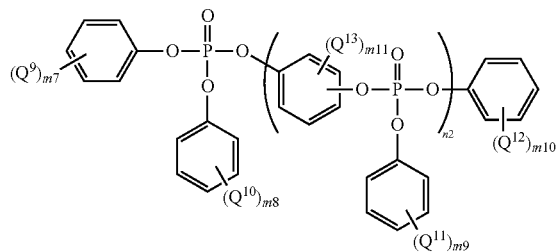
(II)

In the formula (II), each of $Q^9$, $Q^{10}$, $Q^{11}$, and $Q^{12}$ independently represents a hydrogen atom or an alkyl group having a carbon number of from 1 to 6, $Q^{13}$ independently represents a hydrogen atom or a methyl group, each of m7, m8, m9, and m10 independently represents an integer of from 0 to 3, m11 independently represents an integer of from 0 to 4, and n2 represents an integer of from 0 to 10.

The condensed phosphate ester may also be a synthesized product and a commercially available product. Specific examples thereof include commercially available products manufactured by Daihachi Chemical Industry Co., Ltd. ("PX200," "PX201," "PX202," "CR741," and the like), commercially available products manufactured by Adeka Corporation ("ADEKASTAB FP2100," "FP2200," and the like), and the like.

Among them, the condensed phosphate ester is preferably at least one selected from the compounds represented by the following structural formula (1) ("PX200" manufactured by Daihachi Chemical Industry Co., Ltd.) and the compounds represented by the following structural formula (2) ("CR741" manufactured by Daihachi Chemical Industry Co., Ltd.) from the viewpoint of favorable mixing with the wood powder and more suitable moldability by a molding machine.

Structural Formula (1)

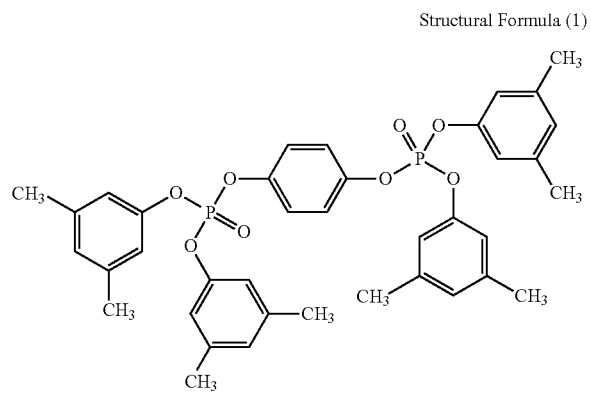

Structural Formula (2)

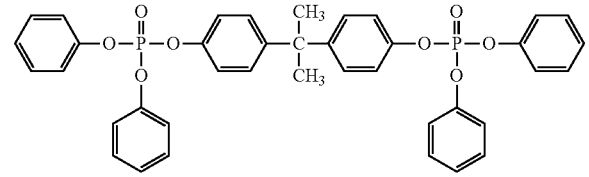

The content of the condensed phosphate ester is, for example, preferably from 5% by mass to 40% by mass (or from about 5% by mass to about 40% by mass), desirably from 5% by mass to 30% by mass, and more desirably from 10% by mass to 20% by mass, with respect to the total amount of the wood powder-containing material.

When the content of the condensed phosphate ester is set to 5% by mass or more, degradation of the fluidity of the wood powder-containing material becomes easily suppressed.

On the other hand, when the content of the condensed phosphate ester is set to 40% by mass or less, degradation of the mechanical strength of an obtained compact becomes easily suppressed.

In the wood powder-containing material, the content ratio of the wood powder to the condensed phosphate ester is, for example, 1:3 to 16:1.

(Other Components)

The wood powder-containing material according to the exemplary embodiment may include other components according to necessity.

Examples of the other components include a flame retardant, a compatibilizing agent, a plasticizer, an oxidation inhibitor, a mold release agent, alight resistant, a weather resistant, a colorant, a pigment, a modifier, a drip preventer, an antistatic agent, a hydrolysis-resistant inhibitor, a filler, a stiffener (a glass fiber, a carbon fiber, talc, clay, mica, glass flake, milled glass, glass beads, crystalline silica, alumina, silicon nitride, alumina nitride, boron nitride, or the like), and the like.

The content of the other components is, for example, preferably from 0% by mass to 10% by mass, and desirably from 0% by mass to 5% by mass with respect to the wood powder-containing material. Here, "0% by mass" refers to no inclusion of the other components.

(Method of Manufacturing the Wood Powder-Containing Material)

The wood powder-containing material according to the exemplary embodiment is manufactured by dissolving and kneading a mixture of the above components.

Specifically, the wood powder-containing material according to the exemplary embodiment is preferably obtained by undergoing a process for mixing the wood powder having a volume average particle diameter of from 1 µm to 5 mm (or from about 1 µm to about 5 mm) and the condensed phosphate ester and a process for mixing the mixture of the wood powder and the condensed phosphate ester and the aliphatic polyester.

In summary, it is preferable that the wood powder and the condensed phosphate ester be mixed, and then the mixture and the aliphatic polyester be dissolved and kneaded sequentially.

Firstly, it is considered that, when the wood powder and the condensed phosphate ester are mixed, the condensed phosphate ester becomes liable to be selectively present on the surface of the wood powder, and the intrinsic properties of the condensed phosphate ester to easily slide are easily supplied to the wood powder.

In addition, it is considered that, when the mixture of the wood powder and the condensed phosphate ester and the aliphatic polyester are kneaded after the mixing of the wood powder and the condensed phosphate ester, the wood powder becomes liable to be dispersed in the aliphatic polyester.

Therefore, when the wood powder-containing material according to the exemplary embodiment is produced through the above processes, the fluidity and the heat resistance are easily supplied, and the wood powder-containing material may be easily molded using a molding machine.

Here, a well-known unit may be used as the unit for mixing, dissolving, and kneading, and examples thereof include biaxial extrusion, a Henschel mixer, a Banbury mixer, a monoaxial screw extruder, a multiaxial screw extruder, a co-kneader, and the like.

[Compact]

The compact according to the exemplary embodiment includes the wood powder-containing material according to the exemplary embodiment.

Specifically, the compact according to the exemplary embodiment is obtained by, for example, molding the wood powder-containing material according to the exemplary embodiment using a molding machine.

Meanwhile, examples of the molding method using a molding machine include injection molding, extrusion molding, blow molding, thermal press molding, calendar molding, coating molding, casting molding, dipping molding, vacuum molding, transfer molding, and the like.

Here, the injection molding may be carried out using a commercially available apparatus, for example, a NEX 150 manufactured by Nissei Plastic Industrial Co., Ltd., a NEX 70000 manufactured by Nissei Plastic Industrial Co., Ltd., SE50D manufactured by Toshiba Machine Co., Ltd., or the like.

At this time, the cylinder temperature is desirably from 170° C. to 280° C., and more desirably from 180° C. to 270° C. In addition, the metal mold temperature is desirably from 40° C. to 110° C., and more desirably from 50° C. to 110° C.

The compact according to the exemplary embodiment may be used suitably for use in electronic and electric devices, home appliances, vessels, vehicle interior materials, and the like. More specifically, the compact may be used for chassis or a variety of parts of home appliances, electronic and electric devices, and the like, wrapping films, storage cases of CD-ROM, DVD, and the like, dishes, food trays, drink bottles, medicine wrapping materials, and the like, and, among them, parts of electronic and electric devices are preferable.

FIG. 1 is a perspective view of the appearance of an image-forming apparatus that is an example of parts of electronic and electrical devices having the compact according to the exemplary embodiment, which is viewed from the front side.

The image-forming apparatus 100 in FIG. 1 has front covers 120a and 120b on the front surface of a main body apparatus 110. The front covers 120a and 120b may be opened and closed so that an operator may operate the inside of the apparatus. Thereby, the operator may refill toner when the toner is all consumed, exchange a consumed process cartridge, and remove a jammed paper when paper jam occurs in the apparatus. FIG. 1 shows the apparatus in a state in which the front covers 120a and 120b are open.

The main body apparatus 110 has an operation panel 130, in which a variety of conditions regarding image-forming, such as the size, number, and the like of paper, are inputted by the operator's operation, and a copy glass 132, on which a document being scanned is to be disposed, provided on the top surface. In addition, the main body apparatus 110 has an automatic document-transporting apparatus 134, which transports the document onto the copy glass 132, provided thereon. Furthermore, the main body apparatus 110 has an image-reading apparatus that reads the image of the document disposed on the copy glass 132 and produces the image data representing the image of the document. The image data produced by the image-scanning apparatus is transported to an image-forming unit through a controller. Meanwhile, the image-reading apparatus and the control section are accommodated inside a chassis 150 that composes a part of the main body apparatus 110. In addition, the image-forming unit is included in the chassis 150 as a process cartridge 142 that may be mounted and removed. The process cartridge 142 is detachable from the image-forming unit by rotating an operation lever 144.

A toner accommodating section 146 is mounted in the chassis 150 of the main body apparatus 110, and toner is refilled through a toner-supplying opening 148. The toner accommodated in the toner accommodating section 146 is configured to be supplied to a developing apparatus.

Meanwhile, the main body apparatus 110 has paper-accommodating cassettes 140a, 140b, and 140c at the bottom portion. In addition, plural transporting rollers that are composed of a pair of rollers respectively are arrayed in the apparatus so as to form a transporting path through which the paper in the paper-accommodating cassettes is transported to the image-forming unit that is located at the upper portion. Meanwhile, the paper in the respective paper-accommodating cassettes is fed one by one by a paper-feeding mechanism that is disposed in the vicinity of the end portion of the transporting path and sent to the transporting path. In addition, a manual paper-feeding section 136 is provided on the side surface of the main body apparatus 110, and paper is also supplied through this manual paper-feeding section.

Paper on which images are formed by the image-forming unit is sequentially transferred to between two fixing rolls that are supported by a chassis 152 that composes a part of the main body apparatus 110 and are in contact with each other, and then exhausted outside the main body apparatus 110. The main body apparatus 110 has plural paper-exhausting sections 138 on the side in which the paper-feeding section 136 is provided and the opposite side, and the image-formed paper is exhausted to the paper-exhausting sections.

In the image-forming apparatus 100, the compact according to the exemplary embodiment is used for, for example, the front covers 120a and 120b, the exterior of the process cartridge 142, the chassis 150, and the chassis 152.

EXAMPLES

Hereinafter, the invention will be specifically described using examples, but the invention is not limited to these examples. Further, hereinafter, "parts" refers to mass standard unless otherwise described.

[Manufacturing of the Wood Powder]

(Wood Powder A)

A wood piece chip (ground using an SPF7007, manufactured by Fuji Kogyo Co., Ltd.) is fed in a pressure vessel (TM10L, manufactured by Unicontrols Co., Ltd.), heated at 150° C. under the saturated water vapor pressure in the presence of water vapor, and pressurized to 3500 Pa. The system is depressurized by releasing the pressure vessel, and the wood piece chip is blasted, thereby producing blasted wood powder. The powder is used as wood powder A.

Meanwhile, the volume average particle diameter of the wood powder A is 4.85 mm, which is measured by the method as described above using a test specimen as described below. This applies in the below.

(Wood Powder B)

Blasted wood powder is produced in the same manner as for the wood powder A except that a wood piece chip is heated at 220° C., and pressurized to 15000 Pa. The powder is used as wood powder B.

The volume average particle diameter of the wood powder B is 1.25 µm, which is measured in the same manner as for the wood powder A.

(Wood Powder C)

A wood piece chip (ground using an SPF7007, manufactured by Fuji Kogyo Co., Ltd.) is fed in a grinder (UCmini 75, manufactured by Uenotex Co., Ltd.), and mechanically ground under conditions of at room temperature and for 2 hours, thereby producing wood powder C.

The volume average particle diameter of the wood powder C is 2.25 mm, which is measured in the same manner as for the wood powder A.

(Wood Powder D)

Wood powder D is produced in the same manner as for the wood powder C except that the conditions are changed to at room temperature (22° C.) and for 30 minutes.

The volume average particle diameter of the wood powder D is 5.58 mm, which is measured in the same manner as for the wood powder A.

(Wood Powder E)

Wood powder E is produced in the same manner as for the wood powder A except that a wood piece chip is pressurized to 30000 Pa at 250° C.

The volume average particle diameter of the wood powder E is 0.88 µm, which is measured in the same manner as for the wood powder A.

Examples 1 to 16

Comparative Examples 1 to 11

Manufacturing of the Wood Powder-Containing Material

The compositions as shown in Table 1 (the numeric values in Table 1 represent parts by mass) are mixed, kneaded in a biaxial extrusion apparatus (TEM3000, manufactured by Toshiba Machine Co., Ltd.) at the cylinder temperature as shown in Table 1, cooled, and pelletized, thereby producing pellet-shaped wood powder-containing materials 1 to 23.

In the wood powder-containing materials 1 to 20, firstly, wood powder and condensed phosphate ester are mixed using a simplified kneader (LABOPLAST MILL, manufactured by Toyo Seiki Seisaku-sho Co., Ltd.), and the mixture and the aliphatic polyester are mixed and kneaded using the biaxial extrusion apparatus (TEM3000, manufactured by Toshiba Machine Co., Ltd.).

In addition, in the wood powder-containing materials 21 to 23, the compositions as shown in Table 1 are mixed and kneaded at the same time using the biaxial extrusion apparatus (TEM3000, manufactured by Toshiba Machine Co., Ltd.).

(Manufacturing of the Compact)

The wood powder-containing materials obtained in the above manner are manufactured into compacts at the cylinder temperatures and the metal mold temperatures as shown in Table 2 using an injection molder (NEX80, manufactured by Nissei Plastic Industrial Co., Ltd.).

Specifically, 1) ISO multipurpose dumbbell test specimens (the test portion has a length of 100 mm, a width of 10 mm, and a thickness of 4 mm) and 2) D2 test specimens (with a length and a width of 60 mm, a thickness of 2 mm) are manufactured as the compacts.

[Evaluation]

In each of the examples, the following evaluation is carried out on the obtained wood powder-containing materials and the compacts (test specimens).

(Moldability)

The wood powder-containing materials that secure the fluidity and may be molded without being baked or deteriorated are evaluated as favorable moldability with a symbol of "A favorable," and the wood powder-containing materials that do not flow, or are baked or deteriorated are respectively evaluated as poor moldability with a symbol of "C poor fluidity" or "C baked."

(Heat Resistance)

Based on the ISO75 method, the 1.8 MPa load deformation temperatures (° C.) of the ISO multipurpose dumbbell test specimens are measured using an HDT measuring apparatus (HDT6, manufactured by Toyo Seiki Seisaku-sho Co., Ltd.), and the heat resistance is evaluated.

(Flexibility)

Based on the 150178 method, bending tests are carried out on the ISO multipurpose dumbbell test specimens using an instron (INSTRON VR6, manufactured by Toyo Seiki Seisaku-sho Co., Ltd.), the modulus of bending elasticity (MPa) and the bending fracture strain (%) are measured, and the flexibility is evaluated.

(Dimensional Stability)

The D2 test specimen is left idle for 1000 hours under conditions of at 28° C. and 90% RH, the dimensional change rate of each of the four 60 mm-long sides of the test specimen before and after being left idle is measured, and the average value of the four sides is evaluated as the dimensional change rate (%).

TABLE 1

| Wood powder-containing material | Wood powder | | | | | Aliphatic polyester | | | |
|---|---|---|---|---|---|---|---|---|---|
| | Wood powder A | Wood powder B | Wood powder C | Wood powder D | Wood powder E | Polylactic acid | | Polyhydroxy butyrate | Polybutylene succinate |
| | | | | | | TERRAMAC TE2000 | 3051D | BIO BALL 30 | BIONOLE #2000 |
| 1 | 50 | | | | | 40 | | | |
| 2 | 70 | | | | | 10 | | | |
| 3 | 90 | | | | | 5 | | | |
| 4 | 30 | | | | | 60 | | | |

TABLE 1-continued

| | | | | | | | |
|---|---|---|---|---|---|---|---|
| 5 | 50 | | | | 20 | | |
| 6 | 30 | | | | | 30 | |
| 7 | | 50 | | | 40 | | |
| 8 | | | 50 | | 40 | | |
| 9 | 50 | | | | | 40 | |
| 11 | 50 | | | | | | 40 |
| 12 | 50 | | | | | | | 40 |
| 13 | 50 | | | | 40 | | |
| 14 | 50 | | | | 40 | | |
| 15 | | | 50 | | 40 | | |
| 16 | | | 70 | | 10 | | |
| 17 | | | 30 | | 60 | | |
| 18 | | | | 50 | 40 | | |
| 19 | | | | 70 | 10 | | |
| 20 | | | | 30 | 60 | | |
| 21 | 2 | 78 | | | | | |
| 22 | 2 | 68 | | | | | |
| 23 | 2 | 88 | | | | | |

| | | Other | | | | | |
|---|---|---|---|---|---|---|---|
| | | Poly-propylene | Maleic acid-denatured poly-propylene | Condensed phosphate esters | | | Kneading conditions Cylinder |
| Wood powder-containing material | | NOVATEC BC3L | UMEX CA60 | PX-200 | CR-741 | ADEKASTAB FP2200 | temperature (° C.) |
| 1 | | | | 10 | | | 180 |
| 2 | | | | 20 | | | 185 |
| 3 | | | | 5 | | | 190 |
| 4 | | | | 10 | | | 170 |
| 5 | | | | 30 | | | 170 |
| 6 | | | | | 40 | | 160 |
| 7 | | | | 10 | | | 180 |
| 8 | | | | 10 | | | 180 |
| 9 | | | | 10 | | | 180 |
| 11 | | | | 10 | | | 180 |
| 12 | | | | 10 | | | 180 |
| 13 | | | | | 10 | | 180 |
| 14 | | | | | | 10 | 180 |
| 15 | | | | 10 | | | 180 |
| 16 | | | | 20 | | | 175 |
| 17 | | | | 10 | | | 170 |
| 18 | | | | 10 | | | 180 |
| 19 | | | | 20 | | | 175 |
| 20 | | | | 10 | | | 170 |
| 21 | | 18 | 2 | | | | 180 |
| 22 | | 18 | 2 | | | | 180 |
| 23 | | 8 | 2 | | | | 180 |

TABLE 2

| | Wood piece-Containing material | Molding conditions | | Moldability | Heat resistance 1.8 MPa load deformation temperature (° C.) | Flexibility | | Dimensional stability Dimensional change rate (%) |
|---|---|---|---|---|---|---|---|---|
| | | Cylinder temperature (° C.) | Metal mold temperature (° C.) | | | Modulus of Bending elasticity (MPa) | Bending fracture strain (%) | |
| Example 1 | Material 1 | 160 | 60 | A favorable | 108 | 2200 | 20 | 0.085 |
| Example 2 | Material 1 | 180 | 70 | A favorable | 107 | 2200 | 21 | 0.088 |
| Example 3 | Material 1 | 200 | 80 | A favorable | 107 | 2100 | 21 | 0.094 |
| Example 4 | Material 2 | 190 | 70 | A favorable | 132 | 2950 | 18 | 0.125 |
| Example 5 | Material 3 | 200 | 80 | A favorable | 152 | 3250 | 14 | 0.142 |
| Example 6 | Material 4 | 180 | 70 | A favorable | 92 | 2150 | 19 | 0.049 |
| Example 7 | Material 5 | 170 | 60 | A favorable | 75 | 1900 | 28 | 0.075 |
| Example 8 | Material 6 | 160 | 60 | A favorable | 72 | 1900 | 35 | 0.074 |
| Example 9 | Material 7 | 180 | 70 | A favorable | 99 | 2100 | 24 | 0.105 |
| Example 10 | Material 8 | 190 | 70 | A favorable | 115 | 2450 | 18 | 0.069 |
| Example 11 | Material 9 | 180 | 70 | A favorable | 110 | 2200 | 18 | 0.082 |
| Example 12 | Material 10 | 160 | 60 | Afavorable | 98 | 1850 | 42 | 0.065 |
| Example 13 | Material 11 | 180 | 70 | A favorable | 103 | 2400 | 13 | 0.072 |
| Example 14 | Material 12 | 180 | 70 | Afavorable | 90 | 1750 | 38 | 0.079 |
| Example 15 | Material 13 | 160 | 50 | A favorable | 92 | 1950 | 32 | 0.035 |

TABLE 2-continued

| | Wood piece-Containing material | Molding conditions | | Moldability | Heat resistance 1.8 MPa load deformation temperature (° C.) | Flexibility | | Dimensional stability |
| | | Cylinder temperature (° C.) | Metal mold temperature (° C.) | | | Modulus of Bending elasticity (MPa) | Bending fracture strain (%) | Dimensional change rate (%) |
|---|---|---|---|---|---|---|---|---|
| Example 16 | Material 14 | 180 | 70 | A favorable | 110 | 2350 | 17 | 0.078 |
| Comparative Example 1 | Material 15 | 190 | 80 | C poor fluidity | 100 | 5400 | 0.02 | 1.55 |
| Comparative Example 2 | Material 15 | 210 | 100 | C poor fluidity | 100 | 5400 | 0.01 | 1.82 |
| Comparative Example 3 | Material 15 | 230 | 100 | C baked | 95 | 5200 | 0.01 | 1.99 |
| Comparative Example 4 | Material 16 | 230 | 100 | C baked | 105 | 5800 | 0.01 | 2.56 |
| Comparative Example 5 | Material 17 | 210 | 100 | C poor fluidity | 95 | 5100 | 0.02 | 1.75 |
| Comparative Example 6 | Material 18 | 190 | 80 | C baked | 60 | 4900 | 0.05 | 2.85 |
| Comparative Example 7 | Material 19 | 190 | 80 | C poor fluidity | 60 | 5100 | 0.05 | 3.05 |
| Comparative Example 8 | Material 20 | 180 | 60 | C baked | 57 | 4700 | 0.07 | 2.75 |
| Comparative Example 9 | Material 21 | 180 | 80 | C baked | 98 | 4800 | 0.05 | 2.85 |
| Comparative Example 10 | Material 22 | 180 | 80 | C poor fluidity | 105 | 4900 | 0.02 | 3.25 |
| Comparative Example 11 | Material 23 | 180 | 80 | C poor fluidity | 110 | 5300 | 0.01 | 3.61 |

From the above results, it is found that the examples of the exemplary embodiment have more favorable moldability than the comparative examples. In addition, it is found that both the flexibility (bending fracture strain) and the dimensional stability are favorable.

Here, the details of the kinds of the materials in the respective tables are shown.

—Aliphatic Polyester—
Polylactic acid: "TERRAMAC TE2000" manufactured by Unitika Ltd.
Polylactic acid: "3051D," manufactured by NatureWorks LLC
Polyhydroxy butyrate: "BIOPOL 30" manufactured by Monsanto Japan Limited
Polybutyrene succinate: "BIONOLE #2000" manufactured by Showa Denko K.K.

—Condensed Phosphate Ester—
"PX200" manufactured by Daihachi Chemical Industry Co., Ltd.: a compound represented by the structural formula (1),
"CR741" manufactured by Daihachi Chemical Industry Co., Ltd.: a compound represented by the structural formula (2)
"ADEKASTAB FP2200," manufactured by Adeka Corporation (nitrogen-containing flame retardant)

—Other—
Polypropylene: "NOVATEC BC3L," manufactured by Japan Polypropylene
Maleic acid-denatured polypropylene "UMEX CMO" manufactured by Sanyo Chemical Industries Ltd.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A wood powder-containing material comprising:
   wood powder having a volume average particle diameter of from about 1 μm to about 5 mm;
   an aliphatic polyester; and
   a condensed phosphate ester.

2. The wood powder-containing material according to claim 1, wherein
   a content of the wood powder is from about 30% by mass to about 90% by mass with respect to a total amount of the wood powder-containing material,
   a content of the aliphatic polyester is from about 5% by mass to about 65% by mass with respect to the total amount of the wood powder-containing material, and
   a content of the condensed phosphate ester is from about 5% by mass to about 40% by mass with respect to the total amount of the wood powder-containing material.

3. The wood powder-containing material according to claim 1, wherein the aliphatic polyester is at least one selected from the group consisting of a polylactic acid, polyhydroxy butyrate, polybutylene succinate, and a copolymer of two or more thereof.

4. The wood powder-containing material according to claim 2, wherein the aliphatic polyester is at least one selected from the group consisting of a polylactic acid, polyhydroxy butyrate, polybutylene succinate, and a copolymer of two or more thereof.

5. The wood powder-containing material according to claim 1, wherein the condensed phosphate ester is at least one selected from the group consisting of the compounds represented by the following structural formula (1) and the compounds represented by the following structural formula (2):

Structural Formula (1)

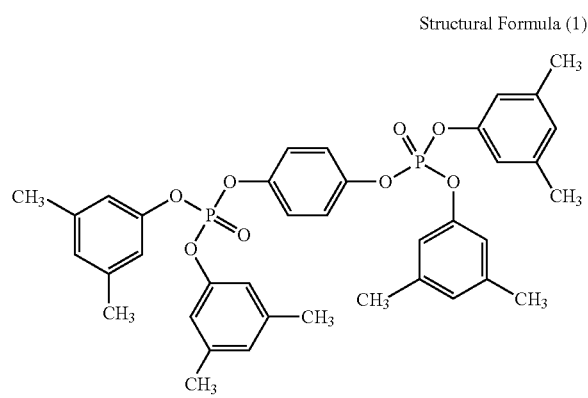

Structural Formula (2)

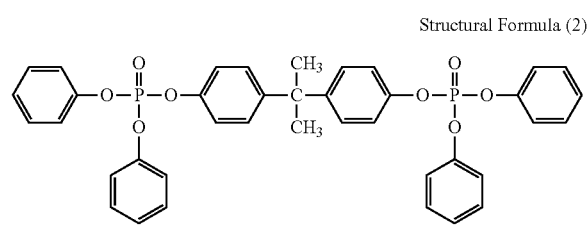

6. The wood powder-containing material according to claim 2, wherein the condensed phosphate ester is at least one selected from the group consisting of the compounds represented by the following structural formula (1) and the compounds represented by the following structural formula (2):

Structural Formula (1)

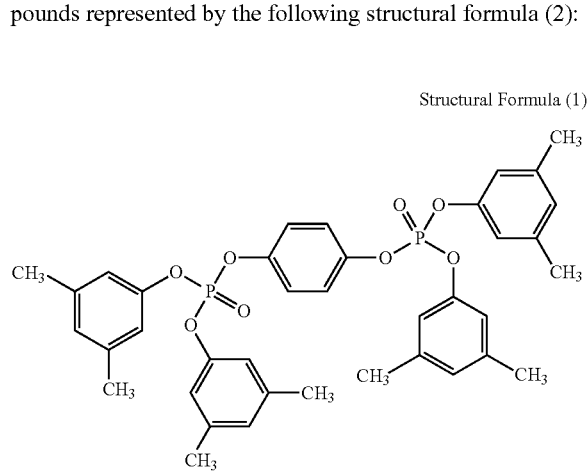

Structural Formula (2)

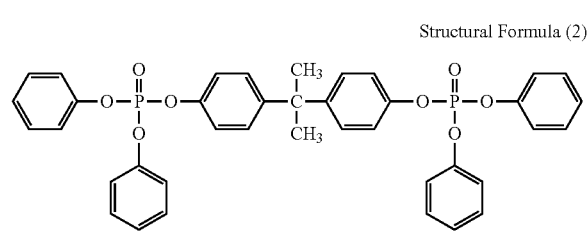

7. The wood powder-containing material according to claim 3, wherein the condensed phosphate ester is at least one selected from the group consisting of the compounds represented by the following structural formula (1) and the compounds represented by the following structural formula (2):

Structural Formula (1)

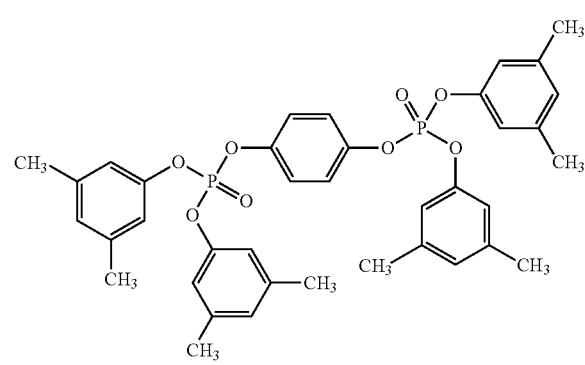

Structural Formula (2)

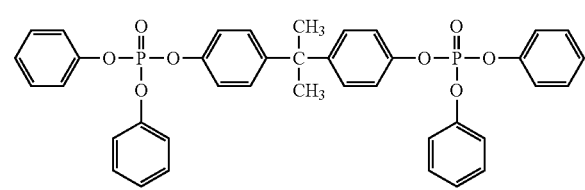

8. The wood powder-containing material according to claim 4, wherein the condensed phosphate ester is at least one selected from the group consisting of the compounds represented by the following structural formula (1) and the compounds represented by the following structural formula (2):

Structural Formula (1)

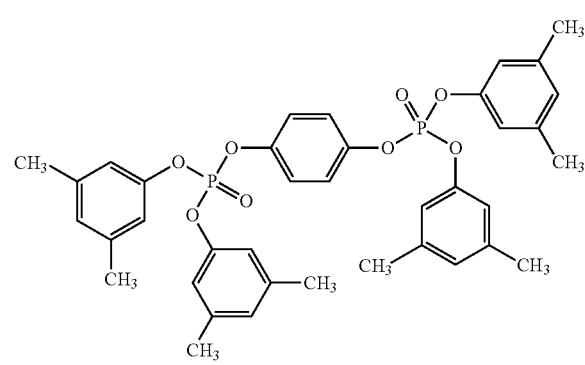

Structural Formula (2)

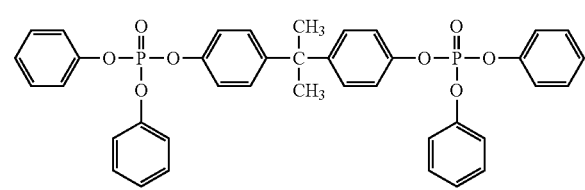

9. The wood powder-containing material according to claim 1, wherein a content ratio of the wood powder to the aliphatic polyester is 1:1 to 16:1.

10. The wood powder-containing material according to claim 1, wherein a content ratio of the wood powder to the condensed phosphate ester is 1:3 to 16:1.

11. A compact comprising:
wood powder having a volume-average particle diameter of from about 1 µm to about 5 mm;
an aliphatic polyester; and
a condensed phosphate ester.

12. The compact according to claim 11, wherein
a content of the wood powder is from about 30% by mass to about 90% by mass with respect to a total amount of the wood powder-containing material,
a content of the aliphatic polyester is from about 5% by mass to about 65% by mass with respect to the total amount of the wood powder-containing material, and
a content of the condensed phosphate ester is from about 5% by mass to about 40% by mass with respect to the total amount of the wood powder-containing material.

13. The compact according to claim 11, wherein the aliphatic polyester is at least one selected from the group consisting of a polylactic acid, polyhydroxy butyrate, polybutylene succinate, and a copolymer of two or more thereof.

14. The compact according to claim 12, wherein the aliphatic polyester is at least one selected from the group consisting of a polylactic acid, polyhydroxy butyrate, polybutylene succinate, and a copolymer of two or more thereof.

15. The compact according to claim 11, wherein the condensed phosphate ester is at least one selected from the group consisting of the compounds represented by the following structural formula (1) and the compounds represented by the following structural formula (2):

Structural Formula (1)

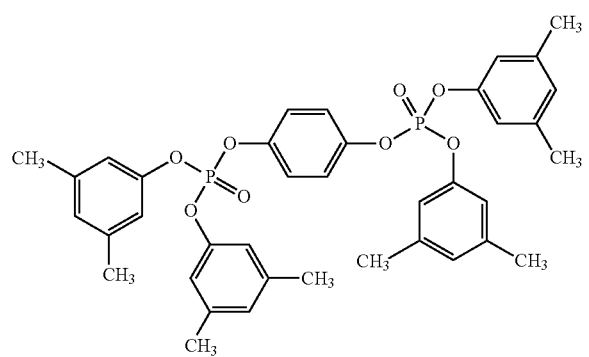

Structural Formula (2)

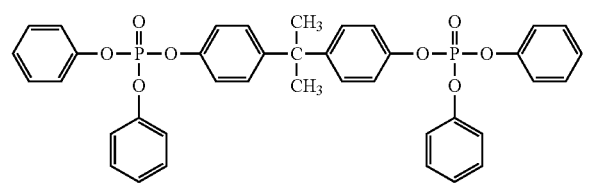

16. The compact according to claim 12, wherein the condensed phosphate ester is at least one selected from the group consisting of the compounds represented by the following structural formula (1) and the compounds represented by the following structural formula (2):

Structural Formula (1)

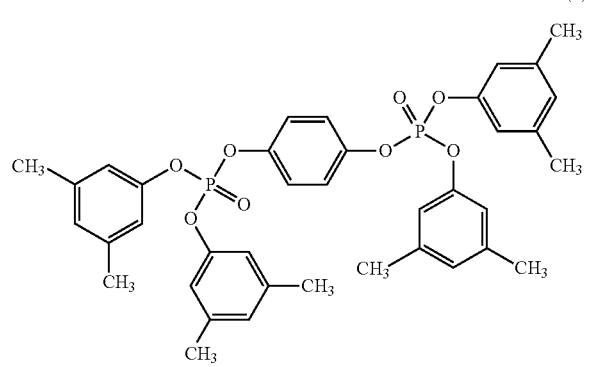

-continued

Structural Formula (2)

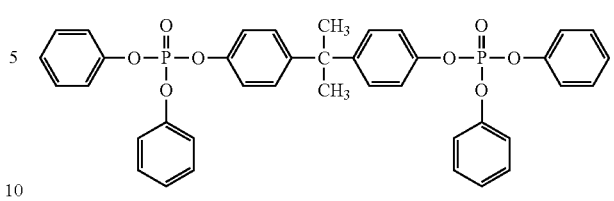

17. The compact according to claim 13, wherein the condensed phosphate ester is at least one selected from the group consisting of the compounds represented by the following structural formula (1) and the compounds represented by the following structural formula (2):

Structural Formula (1)

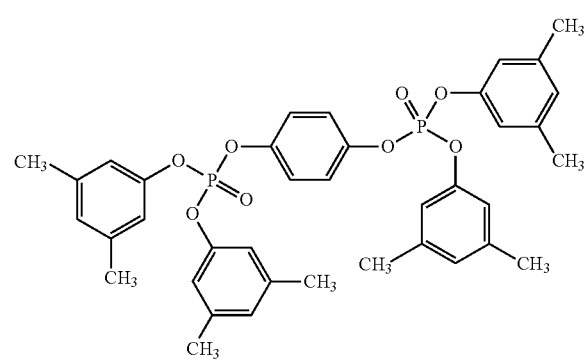

Structural Formula (2)

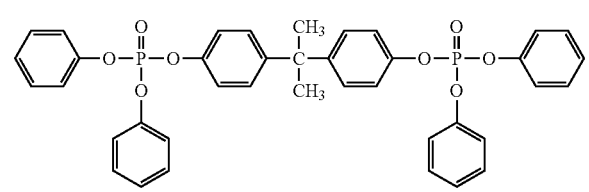

18. The compact according to claim 14, wherein the condensed phosphate ester is at least one selected from the group consisting of the compounds represented by the following structural formula (1) and the compounds represented by the following structural formula (2):

Structural Formula (1)

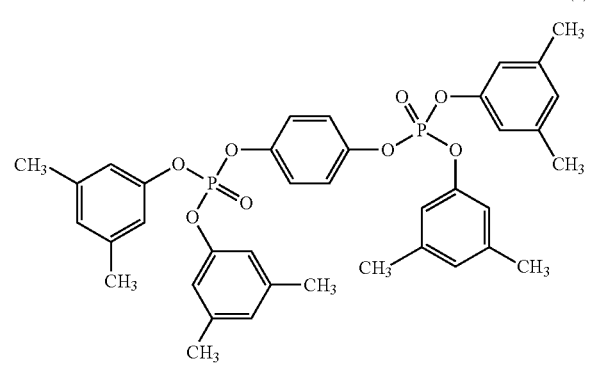

-continued

Structural Formula (2)

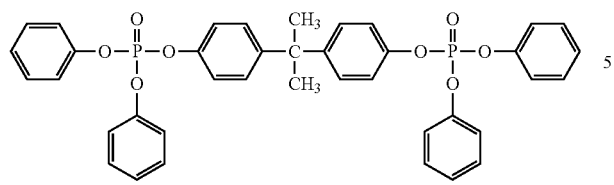

19. The compact according to claim 11, wherein a content ratio of the wood powder to the aliphatic polyester is 1:1 to 16:1.

20. The compact according to claim 11, wherein a content ratio of the wood powder to the condensed phosphate ester is 1:3 to 16:1.

21. A method of manufacturing a wood powder-containing material, comprising:
    mixing wood powder having a volume average particle diameter of from about 1 µm to about 5 mm and a condensed phosphate ester; and
    mixing a mixture of the wood powder and the condensed phosphate ester and an aliphatic polyester.

* * * * *